U S 005297948A

United States Patent [19]

Sadr

[11] Patent Number: 5,297,948
[45] Date of Patent: Mar. 29, 1994

[54] EXTRUDER SCREW FOR USE IN FOAM PLASTIC EXTRUDER

[75] Inventor: Changize Sadr, Toronto, Canada

[73] Assignee: ABC Group, Rexdale, Canada

[21] Appl. No.: 950,778

[22] Filed: Sep. 24, 1992

Related U.S. Application Data

[63] Continuation of Ser. No. 611,765, Nov. 13, 1990, abandoned.

[51] Int. Cl.⁵ .............................................. B29C 47/00
[52] U.S. Cl. ...................................... 425/208; 366/75; 366/76; 425/207
[58] Field of Search ............... 425/203, 207, 208; 366/76, 79, 80, 81, 88, 90, 169, 96-99, 75; 264/102

[56] References Cited

U.S. PATENT DOCUMENTS

| | | | |
|---|---|---|---|
| 2,622,469 | 12/1952 | Gray | 425/208 |
| 2,754,542 | 7/1956 | Henning et al. | 425/208 |
| 3,110,060 | 11/1963 | Rengert | 425/203 |
| 3,121,914 | 2/1964 | Olson et al. | 425/208 |
| 3,371,379 | 3/1968 | Reifenhäuser | 366/75 |
| 3,689,182 | 9/1972 | Kovacs | 425/208 |
| 3,712,594 | 1/1973 | Schippers et al. | 366/75 |
| 4,094,946 | 6/1978 | Finkensiep et al. | 425/208 |
| 4,558,954 | 12/1985 | Barr | 425/208 |
| 4,859,068 | 8/1989 | Sironi | 366/76 |
| 4,877,568 | 10/1989 | Austin | 366/76 |
| 4,966,539 | 10/1990 | Pena | 425/208 |

Primary Examiner—David A. Simmons
Assistant Examiner—William J. Matney, Jr.
Attorney, Agent, or Firm—George A. Seaby

[57] ABSTRACT

In the production of foamed plastic articles using a screw extruder, it is known to introduce a gaseous foaming agent into the plastic while the latter is passing through the extruder. It has been found that a foamed thermoplastic with pores or cells of uniform size and distribution can be produced by passing a gaseous foaming agent, e.g. nitrogen gas through a central passage extending substantially the entire length of the extruder screw, discharging the agent into the thermoplastic proximate the discharge end of the extruder, and mixing the foaming agent with the plastic immediately prior to discharge of the mixture into a mold.

4 Claims, 2 Drawing Sheets

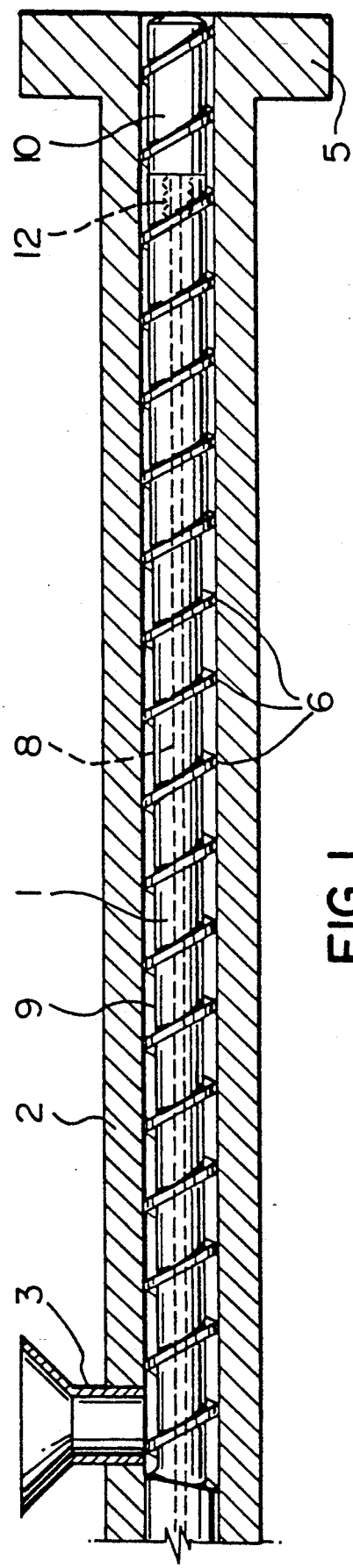
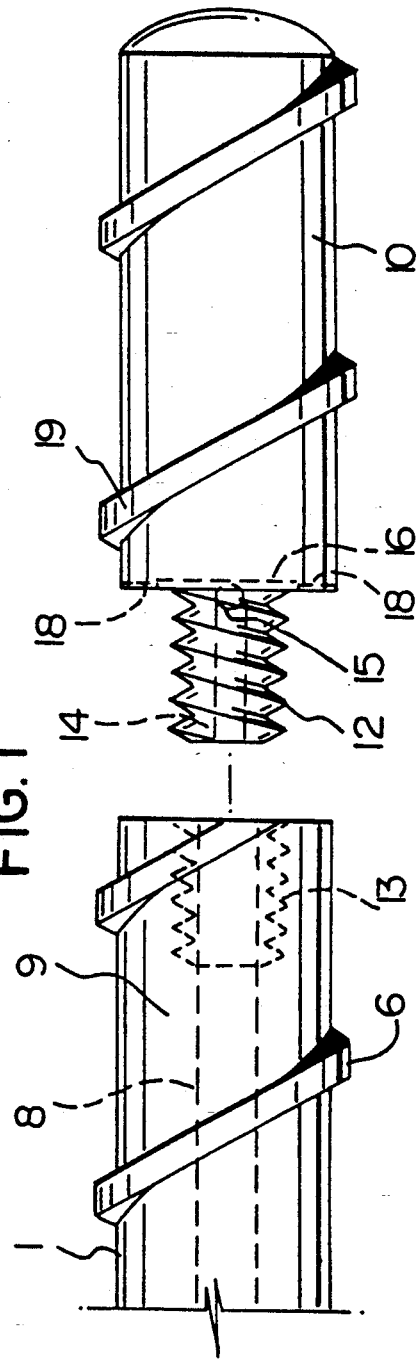

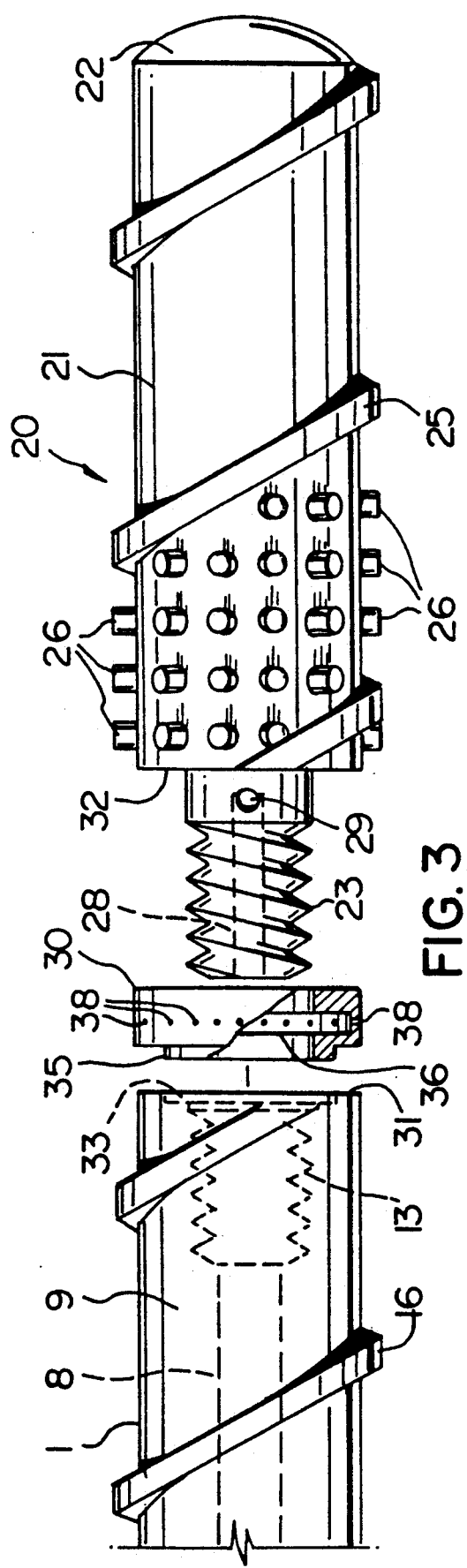
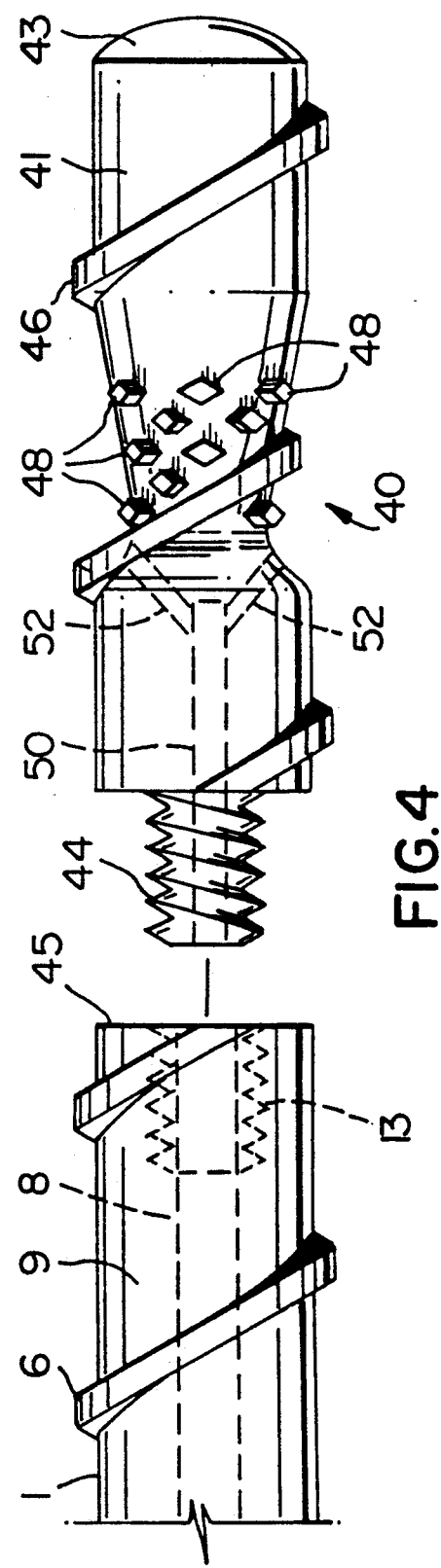
FIG. 3
FIG. 4

5,297,948

EXTRUDER SCREW FOR USE IN FOAM PLASTIC EXTRUDER

This is a continuation of application Ser. No. 07/611,765 filed Nov. 13, 1990, now abandoned.

BACKGROUND OF THE INVENTION

1. Field of the Invention

This invention relates to an extruder screw for use in an extruder for molding foamed plastic articles.

2. Discussions of the Prior Art

When molding foamed, microcellular plastic articles it is important to produce uniform cell sizes. Both durability and strength of the molded articles are dependent upon cell size and uniformity. In the extrusion molding of foamed articles, the usual manner of controlling cell size and uniformity include altering the foaming agent, pressure and temperature of extrusion, and changes to the mixing portion of the extruder. In spite of the various efforts, a need still exists for foamed plastic articles containing pores or cells of uniform size and distribution.

The object of the present invention is to meet the above defined need by providing a relatively simple extruder screw for use in the molding of foamed plastic articles of uniform cell size.

GENERAL DESCRIPTION OF THE INVENTION

Accordingly, the present invention relates to an extruder screw for use in an extruder including an elongated barrel, an inlet for introducing solid plastic into the barrel near one end thereof, and an outlet at the other end of the barrel for discharging molten plastic from the barrel, the screw comprising elongated cylindrical body means for rotation in the barrel; helical flight means on substantially the entire length of said body means for feeding molten plastic through the barrel during rotation of said screw means; first axial passage means in said body means extending from said one end to the other end of said body means for carrying gaseous foaming agent through said body means; head means on said other end of said body means; bolt means on said head means at the upstream end thereof in the direction of foaming agent flow for removably mounting the head means on said body means; second axial passage means in said head means forming a continuation of said first axial passage means; third, generally radially extending passage means in said head means proximate the outlet end of the extruder barrel for discharging the gaseous foaming agent from the screw for intimate mixing with the molten plastic immediately prior to extrusion from the barrel.

BRIEF DESCRIPTION OF THE DRAWINGS

The invention will be described in greater detail with reference to the accompanying drawings, which illustrate preferred embodiments of the invention and wherein:

FIG. 1 is a schematic, longitudinal sectional view of an extruder incorporating a screw in accordance with the present invention;

FIG. 2 is a schematic, exploded, side view of the discharge end of the screw of FIG. 1;

FIG. 3 is a schematic, exploded side view of the discharge end of another embodiment of the screw of FIG. 1;

FIG. 4 is a schematic, exploded side view of the discharge end of yet another embodiment of the screw of FIG. 1.

DESCRIPTION OF PREFERRED EMBODIMENT

With reference to FIG. 1, the screw 1 of the present invention is designed for use in an elongated cylindrical barrel 2. Plastic is fed into the heated barrel 2 via an inlet hopper 3 for discharge through the outlet or discharge end 5 of the barrel 2. The plastic is fed through the barrel 2 by the helical flight 6 of the screw 1, which in effect is an auger. The screw 1 is connected to a conventional drive (not shown) for rotating the screw.

Nitrogen, which acts as a foaming agent, is fed through a central passage 8 in the body 9 of the screw 1 and is discharged into the plastic proximate the discharge end 5 of the barrel 2. For such purpose, the screw 1 includes a head 10 which is connected to the screw body 9 by a bolt 12, which extends into the threaded downstream end 13 of the passage 8. As best shown in FIG. 2, the head 10 includes a central, axially extending passage 14 in the bolt 12 communicating with a radially extending passage 15. Nitrogen discharged from the passage 15 enters an annular passage 16, and is discharged from the head 10 through a plurality of radially extending orifices 18 (two shown). Mixing of the foaming agent (nitrogen) with the plastic is effected by the section 19 of the helical flight on the head 10.

A second form of screw head generally indicated at 20 is shown in FIG. 3. The head 20 includes a cylindrical body 21 with a convex discharge end 22 and a bolt 23 at the other end thereof for connecting the head to the screw body 9. A helical flight section 25 and a plurality of cylindrical mixing fingers 26 are provided on the body 21. As in the case of the head 10, an axially extending passage 28 is provided in the bolt 23 communicating with a radially extending passage 29 near the inner end of the bolt.

A short, annular insert 30 is provided between the downstream end 31 (in the direction of plastic and nitrogen flow) of the screw body 1 and the upstream end 32 of the body 21 of the head 20. A recess 33 in the end 31 of the body 1 receives a reduced diameter end or neck 35 on the insert 30 for positioning the latter and preventing radial movement thereof. The insert 30 contains an internal annular groove 36 for receiving nitrogen from the passage 29, and a plurality of radially extending orifices 38 through which nitrogen is discharged from the screw for mixing with the plastic.

With reference to FIG. 4, a third embodiment of the discharge head, which is generally indicated at 40, includes an elongated body 41 of circular cross section with a convex downstream end 43 and a bolt 44 at the upstream end for mating with a threaded discharge end 45 of the passage 8. A helical flight section 46 completes the flight 6 to the discharge end of the screw. Diamond cross section mixing posts or pins 48 extend radially outwardly from a concave neck portion 49 of the body 41.

The passage 8 in the screw body 9 communicates with an axially extending passage 50 in the bolt 44. The passage 50 extends into the body 41 of the head 40. Nitrogen passing through the passage 50 is discharged from the head 40 via a plurality of inclined passages 52, which are spaced equidistant apart.

In using the apparatus described above, a thermoplastic material is introduced into the extruder barrel 2 via the inlet hopper 3, and fed the length of the barrel by the screw 1. Immediately upstream of the discharge end 5 of the barrel 2, gaseous foaming agent is introduced into the thermoplastic material. The foaming agent ($N_2$) is fed through the longitudinally extending central passage 8 from the driven or inlet end of the barrel 2. The foaming agent mixes or is mixed with the thermoplastic material, and the resulting mixture is immediately discharged form the barrel 2.

For example, nitrogen gas from a high pressurized tank (6,000 psi) is introduced into the screw 1 at a pressure dependent upon the melt viscosity of the thermoplastic material being extruded. The pressure of the injected gas should be higher than the pressure built up in the barrel; otherwise, the gas will not penetrate the surface of the plastic. Of course, the pressure is varied to suit the material being extruded. The barrel temperature depends on the chemistry of the materials. For example, polyester foams are produced by injecting at a temperature of 400° F., whereas TPOs (thermoplastic polyolefins) are injected at 800 psi and a temperature of 360° F.

The above described method can be used to produce foamed, microcellular thermoplastic articles of any processing materials. However, processing conditions vary, depending upon the chemistry of the plastic and product design. Materials employed in the method include simple commodity resins such as polyethylene and polypropylene, and engineered resins such as polyphenyl oxides, nylon, polyethylterephthalate (PET), polybutylterephthate (PBT), and other compounded materials such as TPOs (thermoplastic polyolefins) and thermoplastic polyesters. The density of the final product can be adjusted according to the use of the product from 0.3 to 1.2 g/cc with uniform cell structure.

As mentioned hereinbefore, uniform cell size is important for product durability. For such purpose, external lubricants in amounts of 0-1% such as waxes, e.g. zinc stearate can be added to the thermoplastic. The waxes also aid processing and uniform gas dispersion. Results of tests also show that some nucleating agents help control cell size. Fillers, which act as nucleating agents, include talc and zinc oxide. The nucleating agents are used in amounts of 0-5%. It is worth noting that too much nucleating agent will act as a filler and affect flexibility or flex life of the product. A more abrasion resistant product is produced by adding up to 30% powdered Teflon (trade mark for polytetrafluoroethylene) to the thermoplastic.

One application of the method is the production of so-called Jounce bumpers, which absorb impact in automobiles at certain deflections. Bumpers produced using the method and apparatus disclosed herein showed superior performance at cold temperatures, e.g. −40° C.

Finally, the method and apparatus proposed by applicant yield recyclable products, which is a major advantage over thermosetting foamed plastic products. There is no change in performance or cell uniformity when 100% regrind plastic is used as the source of thermoplastic material.

We claim:

1. An extruder screw for use in an extruder including an elongated barrel, an inlet for introducing solid plastic into the barrel near one end thereof, and an outlet at the other end of the barred for discharging molten plastic from the barrel, the screw comprising substantially continuous elongated cylindrical body means for rotation in the barrel; helical flight means on substantially the entire length of said body means for receiving material from said inlet and for feeding molten plastic through the barrel during rotation of said body means; first axial passage means in said body means extending from said one end to the other end of said body means for carrying gaseous foaming agent through said body means; thread means in said first axial passage means at said other end of the body means for receiving head means on said other end of said body means; bolt means on said head means at the upstream end thereof in the direction of foaming agent flow for engaging said thread means, permitting removable mounting of the head means on said body means; second axial passage means in said head means forming a continuation of said first axial passage means; third, generally radially extending passage means in said head means proximate the outlet end of the extruder barrel for discharging the gaseous foaming agent from the screw for intimate mixing with the molten plastic immediately prior to extrusion from the barrel.

2. A screw according to claim 1 including a radially extending passage in said bolt means communicating with said second passage means; an annular passage in said head means around said bolt means for receiving foaming agent from said radial passage; and radially extending orifice means for discharging foaming agent from said annular passage into the molten plastic between the screw body and the barrel.

3. A screw according to claim 1, wherein said third passage means includes a plurality of inclined passages in said head means for discharging the foaming agent in a downstream direction from the downstream end of said second passage means.

4. A screw according to claim 1, including annular insert means on said bolt means between said head means and the downstream end of said body means defining an annular passage around said bolt means; a radially extending passage in said bolt means for feeding foaming agent from the downstream end of said second passage means to said annular passage; and a plurality of radially extending orifices in said insert means for discharging foaming agent from said annular passage into the plastic between said body means and the molten barrel.

* * * * *